(12) United States Patent
Ishikawa et al.

(10) Patent No.: US 7,028,792 B2
(45) Date of Patent: Apr. 18, 2006

(54) ELECTRIC VEHICLE AND PERFORMANCE SETTING METHOD

(75) Inventors: Tetsuhiro Ishikawa, Nishikamo-gun (JP); Hiroshi Yoshida, Chiryu (JP); Hitoshi Sato, Kagamihara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 120 days.

(21) Appl. No.: 10/775,213

(22) Filed: Feb. 11, 2004

(65) Prior Publication Data

US 2004/0159477 A1     Aug. 19, 2004

(30) Foreign Application Priority Data

Feb. 19, 2003  (JP)  ............................. 2003-041571
Apr. 17, 2003  (JP)  ............................. 2003-113159

(51) Int. Cl.
*B60K 1/00* (2006.01)

(52) U.S. Cl. ................................... 180/65.1

(58) Field of Classification Search ...... 180/65.1–65.4; 429/13; 320/101
See application file for complete search history.

(56) References Cited

U.S. PATENT DOCUMENTS

| | | | |
|---|---|---|---|
| 6,321,145 B1 * | 11/2001 | Rajashekara | 701/22 |
| 6,684,135 B1 * | 1/2004 | Uenodai et al. | 701/22 |
| 6,800,387 B1 * | 10/2004 | Shimada et al. | 429/17 |
| 2002/0182454 A1 * | 12/2002 | Autenrieth et al. | 429/9 |
| 2004/0091755 A1 * | 5/2004 | Enjoji et al. | 429/13 |
| 2004/0159480 A1 * | 8/2004 | Ishikawa et al. | 180/65.3 |
| 2004/0204874 A1 * | 10/2004 | Hasuka et al. | 702/60 |
| 2004/0212194 A1 * | 10/2004 | Okusawa et al. | 290/1 R |
| 2005/0076075 A1 * | 4/2005 | Takase et al. | 708/838 |

FOREIGN PATENT DOCUMENTS

| | | |
|---|---|---|
| JP | 8-33120 | 2/1996 |
| JP | 8-130805 | 5/1996 |
| WO | WO 02/29916 | 4/2002 |

* cited by examiner

*Primary Examiner*—J. Allen Shriver
(74) *Attorney, Agent, or Firm*—Oblon, Spivak, McClelland, Maier & Neustadt, P.C.

(57) ABSTRACT

A maximum output of a fuel cell and a capacitance of a capacitor are set so as to be near a point at which a lower limit (a solid line "A" in FIG. 2) of a range in which a first condition is satisfied intersects a lower limit (a dashed line "B" in FIG. 2) of a range in which a second condition is satisfied. In the first condition, full acceleration at start time for obtaining a predetermined high vehicle speed by starting a vehicle at the maximum acceleration required of the vehicle can be repeatedly performed. In the second condition, full acceleration at a medium vehicle speed for increasing a vehicle speed from a medium vehicle speed by approximately 30 km/h at the maximum acceleration required of the vehicle can be repeatedly performed. Then, the fuel cell and the capacitor of this performance are mounted on the electric vehicle. As a result, it is possible to use the fuel cell and the capacitor both of whose performance is suitable for dynamic characteristics required for the vehicle, enhance the energy efficiency, and reduce the cost of the electric vehicle.

16 Claims, 2 Drawing Sheets

ELECTRIC VEHICLE AND PERFORMANCE SETTING METHOD

INCORPORATION BY REFERENCE

The disclosure of Japanese Patent Applications Nos. 2003-041571 filed on Feb. 19, 2003 and 2003-113159 filed on Apr. 17, 2003 including the specification, drawings and abstract are incorporated herein by reference in their entirety.

BACKGROUND OF THE INVENTION

1. Field of the Invention

The invention relates to an electric vehicle and a performance setting method. More particularly, the invention relates to an electric vehicle including a fuel cell and a capacitor which are connected in parallel to a drive circuit of an electric motor that outputs power to an axle shaft. The invention also relates to a method for setting performance of the fuel cell and performance of the capacitor which are to be mounted on the electric vehicle that runs by supplying electric power from the fuel cell and the capacitor to the drive circuit of the electric motor that can output power to the axle shaft without converting a voltage.

2. Description of the Related Art

An electric vehicle which runs using outputs from a fuel cell and a capacitor is disclosed, for example, in Japanese Patent Laid-Open Publication No. 08-33120. It is considered that, in the electric vehicle, it is possible to obtain an output from the capacitor even when the vehicle is continuously operated under high load, by performing control such that an output from the fuel cell increases and the output from the capacitor decreases, in a predetermined acceleration continuation state where acceleration equal to or higher than a predetermined value continues for a predetermined time or longer.

However, in such an electric vehicle, there is a possibility that a fuel cell or a capacitor of inappropriate performance will be used. As mentioned above, in the predetermined acceleration continuation state, the control for increasing the output from the fuel cell and for decreasing the output from the capacitor is performed. Therefore, if the state continues, the entire output required in the state is finally supplied by the output from the fuel cell regardless of the capacitance of the capacitor. Accordingly, a fuel cell which can produce the output required to continue the predetermined acceleration continuation state is used. As a result, the fuel cell of excessive performance is used, which is not preferable in terms of energy efficiency.

SUMMARY OF THE INVENTION

It is an object of the invention to provide an electric vehicle on which a fuel cell and a capacitor that are suitable for dynamic characteristics required and/or in terms of energy efficiency for the vehicle are mounted. It is another object of the invention to provide a method for setting performance of a fuel cell and performance of a capacitor, which are suitable for dynamic characteristics required and/or in terms of energy efficiency for a vehicle, in the electric vehicle on which the fuel cell and the capacitor are mounted.

In an electric vehicle and a performance setting method according to the invention, the following means are employed in order to achieve at least part of the above-mentioned objects.

An electric vehicle according to a first aspect of the invention includes a fuel cell and a capacitor which are connected in parallel to a drive circuit of an electric motor that outputs power to an axle shaft. The maximum output of the fuel cell and the capacitance of the capacitor are set such that a first running condition for obtaining a predetermined high vehicle speed by repeatedly starting the vehicle at the maximum acceleration required of the vehicle, and a second running condition for repeatedly changing the vehicle speed from a first medium vehicle speed to a second medium vehicle speed at the maximum acceleration required of the vehicle are satisfied. According to the first aspect, since the maximum output of the fuel cell and the capacitance of the capacitor are set such that the above-mentioned first running condition and second running condition are satisfied, it is possible to use the fuel cell and the capacitor, both of whose performance is suitable for the dynamic characteristics required for the vehicle. As a result, a fuel cell and a capacitor of excessive performance are not used. Therefore, it is possible to enhance the energy efficiency of the vehicle.

In the first aspect, the capacitance of the capacitor may be set so as to be within a predetermined range over the minimum capacitance which satisfies the first running condition and the second running condition when the fuel cell is operated in the range up to the maximum output that is set in the fuel cell. Thus, it is possible to use the capacitor whose performance is suitable for the dynamic characteristics required for the vehicle according to the performance of the fuel cell.

In the first aspect, the maximum output of the fuel cell may be set so as to be within a predetermined range over the minimum output that satisfies the first running condition and the second running condition when the capacitor is operated in the range of the capacitance which is set in the capacitor. Thus, it is possible to use the capacitor whose performance is suitable for the dynamic characteristics required for the vehicle according to the performance of the capacitor.

In the first aspect, the maximum output of the fuel cell and the capacitance of the capacitor may be set so as to be in a predetermined range including a point at which a minimum relationship between the maximum output of the fuel cell and the capacitance of the capacitor that is required for satisfying the first running condition and a minimum relationship between the maximum output of the fuel cell and the capacitance of the capacitor that is required for satisfying the second running condition overlap each other. Thus, it is possible to use the fuel cell and the capacitor both of whose performance is near the minimum level among the performance suitable for the dynamic characteristics required for the vehicle. As a result, it is possible to further enhance the energy efficiency of the vehicle.

In the first aspect, the maximum output of the fuel cell and the capacitance of the capacitor may be set such that the cost of the fuel cell and the capacitor is substantially the minimum. Thus, it is possible to reduce the cost of manufacturing the electric vehicle.

In the first aspect, when the vehicle weight is approximately 2 metric tons (hereinafter, "2t"), the fuel cell and the capacitor may be used at the voltage of 240 to 500V, the maximum output of the fuel cell may be set to a value near 95 kW, and the capacitance of the capacitor may be set to a value near 7F. In this case, the maximum output of the electric motor may be set to a value near 85 kW.

In the first aspect, the maximum output of the electric motor may be set to a value substantially equal to the sum of the maximum output of the fuel cell and the maximum output of the capacitor at the operating voltage of the fuel cell which is operated so as to produce the maximum output. Thus, it is possible to use the capacitor whose performance is suitable for the dynamic characteristics required for the vehicle.

In a performance setting method according to a second aspect of the invention, performance of a fuel cell and performance of a capacitor, which are to be mounted on an electric vehicle that runs by supplying electric power from the fuel cell and the capacitor to a drive circuit of an electric motor that can output power to an axle shaft without converting a voltage, are set. The maximum output of the fuel cell and the capacitance of the capacitor are set such that a first running condition for obtaining a predetermined high vehicle speed by repeatedly starting the vehicle at the maximum acceleration required of the vehicle and a second running condition for repeatedly changing a vehicle speed from a first medium vehicle speed to a second medium vehicle speed at the maximum acceleration required of the vehicle are satisfied.

According to the second aspect, the maximum output of the fuel cell and the capacitance of the capacitor, which are to be mounted on the vehicle, are set such that the first running condition and the second running condition are satisfied. Therefore, it is possible to set the performance of the fuel cell and the performance of the capacitor which are suitable for the dynamic characteristics required for the vehicle. By mounting the fuel cell and the capacitor both of whose performance is thus set on the electric vehicle, it is possible to enhance the energy efficiency of the vehicle.

In the second aspect, the capacitance of the capacitor may be set so as to be within a predetermined range over the minimum capacitance which satisfies the first running condition and the second running condition when the fuel cell is operated in a range up to the maximum output that is set in the fuel cell. Thus, it is possible to set the performance of the capacitor which is suitable for the dynamic characteristics required for the vehicle according to the performance of the fuel cell.

In the second aspect, the maximum output of the fuel cell may be set so as to be within a predetermined range over the minimum output which satisfies the first running condition and the second running condition when the capacitor is operated in the range of the capacitance that is set in the capacitor. Thus, it is possible to set the performance of the fuel cell which is suitable for the dynamic characteristics required for the vehicle according to the performance of the capacitor.

In the second aspect, the maximum output of the fuel cell and the capacitance of the capacitor may be set so as to be in a predetermined range including a point at which a minimum relationship between the maximum output of the fuel cell and the capacitance of the capacitor that is required for satisfying the first running condition and a minimum relationship between the maximum output of the fuel cell and the capacitance of the capacitor that is required for satisfying the second running condition overlap each other. Thus, it is possible to set the performance of the fuel cell and the performance of the capacitor so as to be near the minimum level among the performance of the fuel cell and the performance capacitor which are suitable for the dynamic characteristics required for the vehicle. By mounting the fuel cell and the capacitor both of whose performance is thus set on the electric vehicle, it is possible to further enhance the energy efficiency of the vehicle.

In the second aspect, the maximum output of the fuel cell and the capacitance of the capacitor may be set such that the cost of the fuel cell and the capacitor is substantially the minimum. Thus, it is possible to set the performance of the fuel cell and the performance of the capacitor to the performance whose cost is low among the performance of the fuel cell and the performance of the capacitor which are suitable for the dynamic characteristics required for the vehicle. As a result, it is possible to reduce the cost of manufacturing the electric vehicle.

DETAILED DESCRIPTION OF THE PREFERRED EMBODIMENTS

Figure 1:
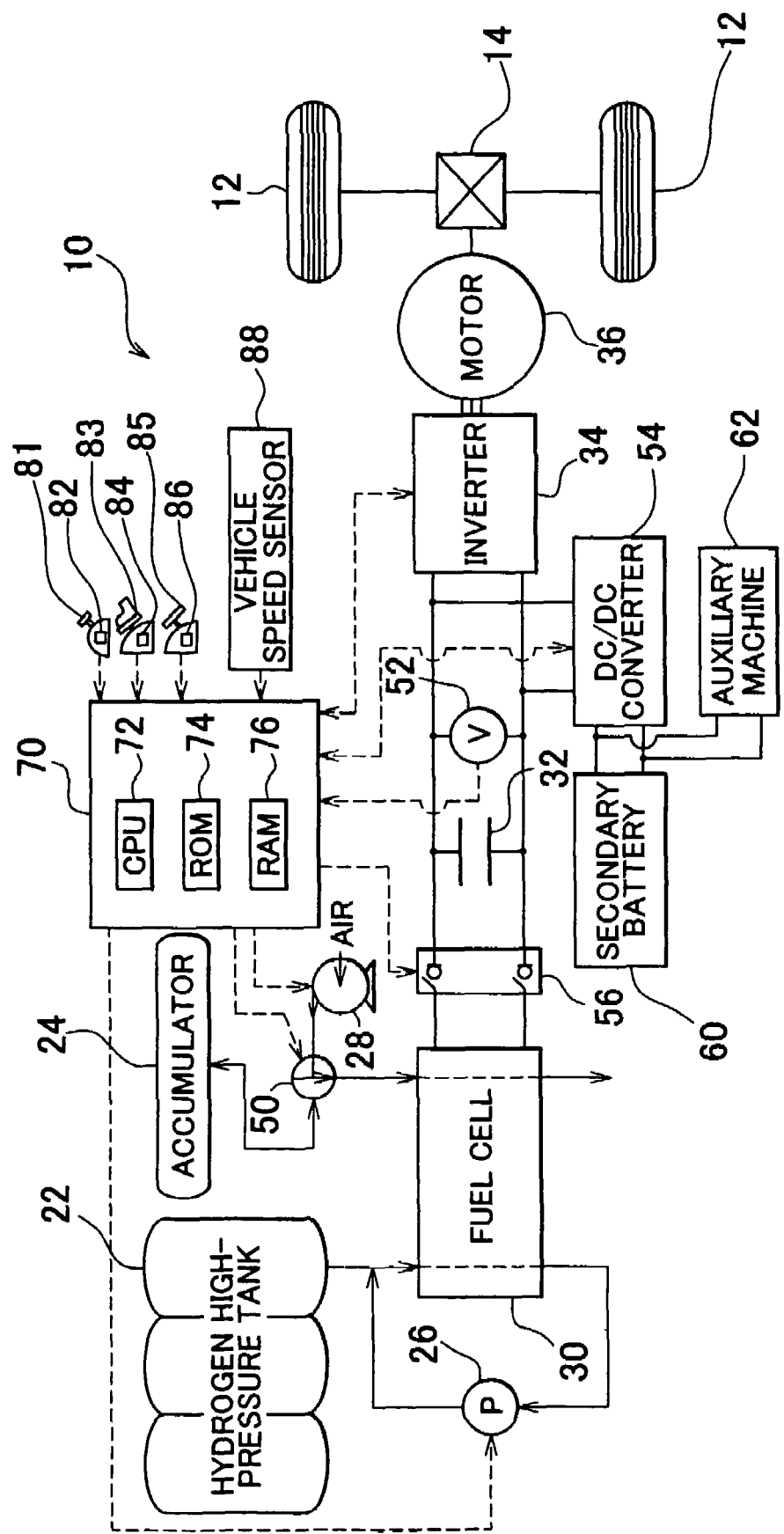
FIG. 1 is a diagram schematically showing a configuration of an electric vehicle according to an embodiment.

Hereafter, an embodiment according to the invention will be described with reference to accompanying drawings. FIG. 1 is a diagram schematically showing a configuration of an electric vehicle 10 according to an embodiment of the invention. As shown in FIG. 1, the electric vehicle 10 according to the embodiment includes a fuel cell 30 which generates electric power using hydrogen gas as fuel gas that is supplied from a hydrogen high-pressure tank 22 and is circulated by a circulating pump 26 and oxygen in the air that is supplied from an air compressor 28 and an accumulator 24 through a switching valve 50; a capacitor 32 which is connected in parallel to the fuel cell 30 through a breaker 56; an inverter 34 which serves as a drive circuit of a drive motor 36 and converts direct current power from the fuel cell 30 and the capacitor 32 to three phase alternating current power; a drive motor 36 which is driven by the three phase alternating current power that is obtained by the inverter 34 and which outputs power to drive wheels 12 through a differential gear 14; and an electronic control unit 70 which controls the entire vehicle. The electric vehicle 10 is configured such that the gross weight is approximately 2t.

The fuel cell 30 is formed of a fuel cell stack (not shown). The fuel cell stack is formed by stacking unit cells with separators interposed between the unit cells. The unit cell is formed by providing an anode electrode and a cathode electrode so as to sandwich an electrolyte membrane. The separator serves as a partition between the adjacent unit cells. The fuel cell 30 generates electric power by electrochemical reaction of the hydrogen gas supplied to the anode electrode through a gas passage formed in the separator and the air supplied to the cathode electrode. In the fuel cell 30, there is provided a circulation passage (not shown) through which a coolant medium (for example, cooling water) can circulate. Due to circulation of the coolant medium through the circulation passage, the temperature in the fuel cell 30 is maintained at an appropriate temperature (for example, 65° C. to 85° C.). The fuel cell 30 whose maximum output (rated value) is 95 kW and operating voltage is 240 to 400V is mounted on the electric vehicle 10 according to the embodiment.

The capacitor 32 is configured, for example, as an electric double layer capacitor (EDLC). The capacitor 32 whose working voltage is 240 to 500V and capacitance is 7F is mounted on the electric vehicle 10 according to the embodiment.

The drive motor 36 is configured, for example, as a known synchronous generator-motor which serves as an electric motor and as a power generator. The drive motor 36 whose rated output is 80 to 85 kW is mounted on the electric vehicle 10 according to the embodiment. The rated output of the drive motor 36 is adjusted and set so as to be substantially equal to the sum of the maximum output of the fuel cell 30 mounted on the electric vehicle 10 and the maximum output of the capacitor 32 at the operating voltage of the fuel cell 30 which is operated so as to produce the maximum output.

A DC/DC converter 54 which converts a high-voltage from the fuel cell 30 and the capacitor 32 to a low-voltage (for example, 12V) is provided on an electric power line from the fuel cell 30 and the capacitor 32. Then, electric power is supplied to a secondary battery 60 as a 12 V power supply and an auxiliary machine 62 mounted on the vehicle.

The electronic control unit 70 is configured as a microprocessor mainly provided with a CPU 72. The electronic control unit 70 includes ROM 74 which stores a processing program and the like, RAM 76 which temporarily stores data, and an input/output port (not shown), in addition to the CPU 72. A power supply voltage from a voltage sensor 52 that is provided in parallel between the capacitor 32 and the inverter 34, a shift position from a shift position sensor 82 which detects a position of a shift lever 81, an accelerator opening from an accelerator pedal position sensor 84 which detects a depressing amount of an accelerator pedal 83, a brake position from a brake pedal position sensor 86 which detects a depressing amount of a brake pedal 85, a vehicle speed V from a vehicle speed sensor 88 which detects a running speed of the vehicle, and the like are input in the electronic control unit 70 through the input port. A drive signal to the circulation pump 26, a drive signal to the air compressor 28, a switching signal to the inverter 34, a direct current power switching signal to the DC/DC converter 54, an opening/closing signal to the breaker 56, a switching signal to the switching valve 50, and the like are output from the electronic control unit 70 through the output port.

In the thus configured electric vehicle 10 according to the embodiment, when the driver depresses the accelerator pedal 83, torque (torque to be output from the drive motor 36) required of the vehicle is set based on the accelerator opening detected by the accelerator pedal position sensor 84 and the vehicle speed V detected by the vehicle sensor 88. The inverter 34 is controlled such that the set torque is output from the drive motor 36. The maximum electric power to be supplied to the drive motor 36 is obtained by subtracting the electric power required for the auxiliary machine from the direct current power, that is the sum of the maximum output of the fuel cell 30 and the maximum output of the capacitor 32 at the operating voltage of the fuel cell 30 which is operated so as to produce the maximum output, and then converting the thus obtained electric power to the three phase alternating current power. Therefore, by selecting the drive motor 36 such that the output from the drive motor 36 is the rated output when the obtained electric power is supplied to the drive motor 36, the motor whose performance is the most suitable for the performance of the fuel cell 30 and the performance of the capacitor 32 is selected. In the embodiment, the drive motor 36 is thus selected. The torque required of the vehicle is set based on the accelerator opening and the vehicle speed V. Meanwhile, the maximum torque is set based on the dynamic characteristics required for the vehicle.

In the electric vehicle 10 according to the embodiment, when the driver depresses the brake pedal 85, the braking torque of the vehicle is set based on the brake pedal position detected by the brake pedal position sensor 86 and the vehicle speed V detected by the vehicle speed sensor 88. Also, the inverter 34 is controlled such that part of the braking torque is supplied by the regenerative torque by the drive motor 36, and the mechanical brake is controlled such that the remaining torque is supplied by the mechanical brake (not shown). The electric power which is obtained by performing regenerative-control of the drive motor 36 is converted to direct current power by the inverter 34, is stored in the capacitor 32, and is used for acceleration of the vehicle when the driver depresses the accelerator pedal 83 next time. Distribution of the set braking torque to the regenerative torque by the drive motor 36 and the torque by the mechanical brake can be performed in any methods in terms of the control. However, considering the energy efficiency, it is preferable to distribute a large amount of the braking torque to the regenerative torque by the drive motor 36.

In this case, the dynamic characteristics required for the vehicle includes the dynamic characteristics which satisfy at least two running conditions. A first running condition is referred to as a "start time full acceleration repeat possible condition", a second running condition is referred to as a "medium vehicle speed full acceleration repeat possible condition" hereinafter. In the start time full acceleration repeat possible condition, full acceleration at the maximum acceleration required to obtain a predetermined high vehicle speed at the start time can be repeatedly performed. In the start time full acceleration repeat possible condition, full acceleration at the maximum acceleration required to increase the vehicle speed from a medium vehicle speed by approximately 30 km/h can be repeatedly performed. Namely, when the dynamic characteristics which satisfy the above-mentioned two conditions can be obtained, the vehicle can withstand the use. In the electric vehicle 10 according to the embodiment, the fuel cell 30 and the capacitor 32 both of whose performance is suitable for the above-mentioned dynamic performance are selected and used such the cost is reduced. Hereafter, the relationship between the performance of the fuel cell 30 and the performance of the capacitor 32, particularly, the relationship between the maximum output of the fuel cell 30 and the capacitance of the capacitor 32 will be described in detail.

Figure 2:
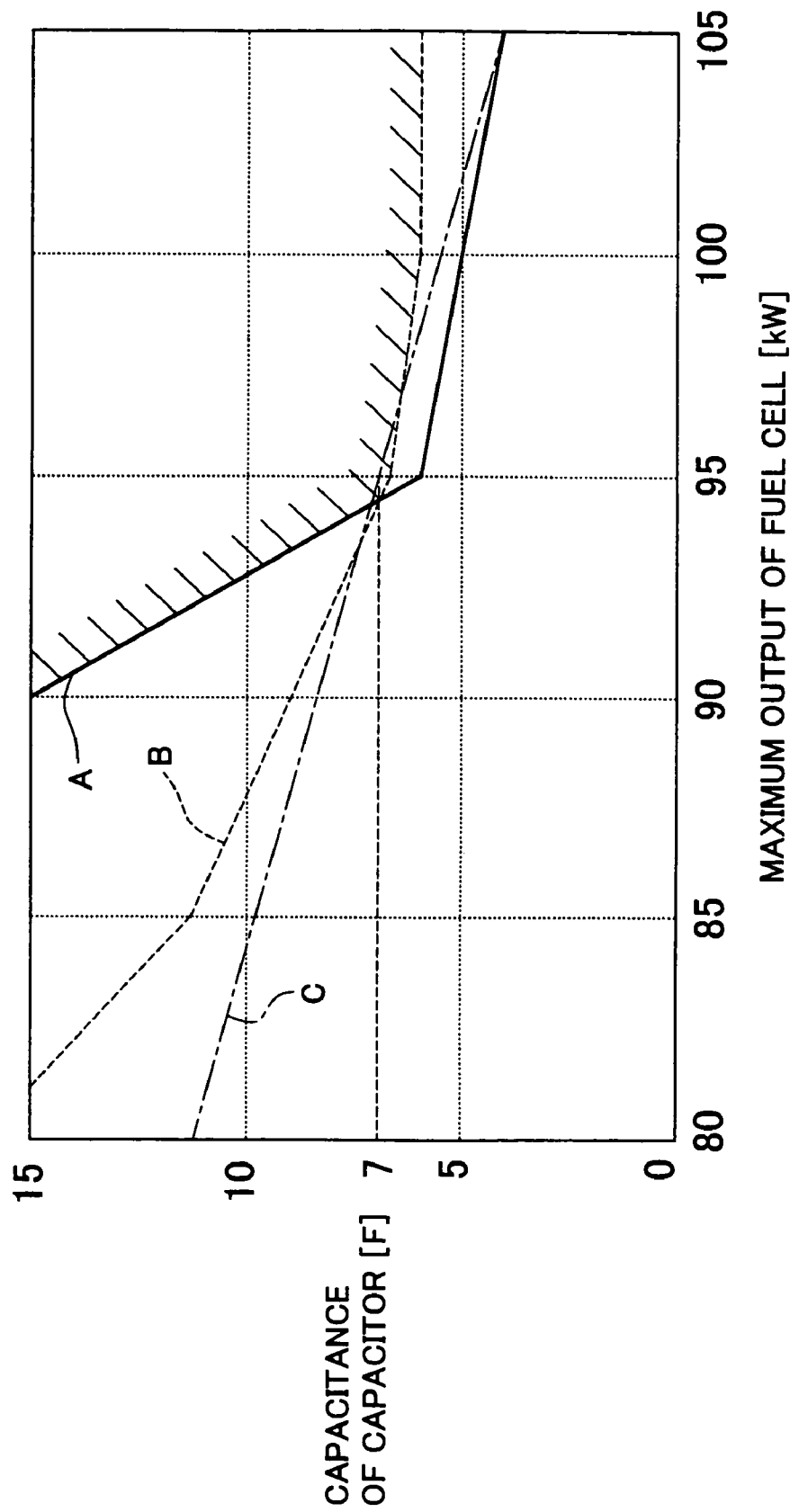
FIG. 2 is a graph showing an example of a relationship among a maximum output of a fuel cell, a capacitance of a capacitor, dynamic characteristics of the vehicle and a cost in the electric vehicle whose gross weight is 2t.

FIG. 2 is a graph showing an example of a relationship among the maximum output of the fuel cell 30, the capacitance of the capacitor 32, the dynamic characteristics of the vehicle and the cost in the electric vehicle whose gross weight is 2t. In the figure, a solid line "A" shows the lower limit of the range in which the start time full acceleration repeat possible condition is satisfied, a dashed line "B" shows the lower limit of the range in which the medium vehicle speed full acceleration repeat possible condition is satisfied, and a chain line "C" shows an equal cost line. The range where the dynamic characteristics required for the vehicle are satisfied is the range where the start time full acceleration repeat possible condition and the medium vehicle speed full acceleration repeat possible conditions are satisfied. Therefore, the range where the dynamic characteristics are satisfied is the range where the upper right range with respect to the solid line "A" and the upper right range with respect to the dashed line "B" overlap each other (hereinafter, referred to as the "condition satisfaction range") in the figure. Among the condition satisfaction range, in the range which has a distance over than predetermined range from the solid line "A" or the dashed line "B" (for example, the upper right corner of the figure), the fuel cell and the capacitor have excessive performance for the dynamic characteristics required for the vehicle, which is not preferable in terms of the energy efficiency. Therefore, among the condition satisfaction range, the range which is over the solid line "A" and also over the dashed line "B" (i.e., the hatched range in the figure. Hereinafter, referred to as a "preferred range") is preferable. Namely, by selecting the fuel cell and the capacitor both of whose performance is in the preferred range and using them as the fuel cell 30 and the capacitor 32, the electric vehicle 10 can be realized which is provided with the fuel cell and the capacitor both of whose performance is suitable for the dynamic characteristics required for the vehicle. Therefore, when the maximum output of the fuel cell 30 to be mounted on the electric vehicle 10 has already been set, the capacitance of the capacitor 32 needs to be set such that the performance of the capacitor 32 is in the preferred range. On the other hand, when the capacitance of the capacitor 32 to be mounted on the electric vehicle 10 has already been set, the maximum output of the fuel cell 30 needs to be set such that the performance of the fuel cell 30 is in the preferred range.

Further, among the preferred range, the range near the intersecting point of the solid line "A" and the dashed line "B" is the necessary/sufficient range where the start time full acceleration repeat possible condition and the medium vehicle speed full acceleration repeat possible condition are both satisfied at the minimum level. Therefore, by selecting the fuel cell and the capacitor both of whose performance is in the necessary/sufficient range and using them as the fuel cell 30 and the capacitor 32, the electric vehicle 10 can be realized which is provided with the fuel cell and the capacitor both of whose performance is necessarily and sufficiently suitable for the dynamic characteristics required for the vehicle. Also, the necessary/sufficient range, as can be seen from the chain line "C", is the range near the minimum cost, among the condition satisfaction range. Therefore, by selecting the fuel cell and the capacitor both of whose performance is in the necessary/sufficient range and using them as the fuel cell 30 and the capacitor 32, it is possible to reduce the cost of the electric vehicle 10. As a result, by selecting the fuel cell and the capacitor both of whose performance is in the necessary/sufficient range, it is possible to use the fuel cell and the capacitor both of whose performance is necessarily and sufficiently suitable for the dynamic characteristics required for the vehicle and both of whose energy efficiency is good. Further, it is possible to reduce the cost. In the electric vehicle 10 according to the embodiment, with the above-mentioned reason, the fuel cell 30 whose maximum output is 95 kW and the capacitor 32 whose capacitance is 7F are used. In this case, the performance of the fuel cell 30 and the performance of the capacitor 32 are in the necessary/sufficient range.

The performance of the fuel cell 30 and the performance of the capacitor 32, which are to be mounted on the electric vehicle 10, change according to the gross weight of the electric vehicle 10 and the dynamic characteristics required for the vehicle. Therefore, an experiment needs to be conducted for each gross weight and each of the dynamic characteristics required for the vehicle so as to obtain the relationship, as shown in FIG. 2. The relationship between the maximum output of the fuel cell and the capacitance of the capacitor, which are to be mounted on the vehicle, needs to be set so as to be near the point at which the lower limit (solid line "A" in FIG. 2) of the range in which the start time full acceleration repeat possible condition is satisfied intersects the lower limit (dashed line "B" in FIG. 2) of the range in which the medium vehicle speed full acceleration repeat possible condition is satisfied. Thus, it is possible to select the fuel cell and the capacitor both of whose performance is suitable for the gross weight of the vehicle and the dynamic characteristics required for the vehicle, and to mount the selected fuel cell and the capacitor on the vehicle.

With the electric vehicle 10 according to the above-mentioned embodiment, the fuel cell 30 and the capacitor 32, both of whose performance is in the necessary/sufficient range where the start time full acceleration repeat possible condition and the medium vehicle speed full acceleration repeat possible condition are both satisfied at the minimum level, are used. Therefore, it is possible to obtain the dynamic characteristics required for the vehicle and to enhance the energy efficiency. Further, it is possible to reduce the cost of manufacturing the electric vehicle 10.

Also, according to the method for setting the maximum output of the fuel cell 30 and the capacitance of the capacitor 32, which are to be mounted on the electric vehicle 10 in the embodiment, by obtaining the necessary/sufficient range where the start time full acceleration repeat possible condition and the medium vehicle speed full acceleration repeat possible condition are both satisfied at the minimum level according to the gross weight of the vehicle and the dynamic characteristics required for the vehicle, it is possible to set the maximum output of the fuel cell and the capacitance of the capacitor which are suitable for the gross weight of the vehicle and the dynamic characteristics required for the vehicle. Therefore, by mounting the fuel cell whose maximum output is thus set and the capacitor whose capacitance is thus set on the vehicle, it is possible to obtain the dynamic characteristics required for the vehicle and to enhance the energy efficiency.

In the case of the electric vehicle in which the capacitor 32 is provided in parallel to the fuel cell 30, such as the electric vehicle 10 according to the embodiment, it is possible to suppress the output from the fuel cell when a request is made by the driver such that a large output which reaches the peak thereof is produced, compared with the case of the electric vehicle in which a secondary battery is provided in parallel to the fuel cell. In the electric vehicle which is provided with the fuel cell and the secondary battery, a large output needs to be produced by the fuel cell since the output from the secondary battery is limited. However, in the electric vehicle 10 which is provided with the fuel cell 30 and the capacitor 32, a large output can be produced by the capacitor 32, if, for a short time. Namely, in the electric vehicle 10 according to the embodiment, a large output is initially produced by the capacitor, when the request is made by the driver such that the output which reaches the peak thereof is produced. Since such a request normally continues only for a short time and does not continue for a long time, it is possible to suppress the large output from the fuel cell 30 due to the output from the capacitor 32. Therefore, in the control of the drive motor 36, it is possible to increase the range where the torque in the peak control while the vehicle is running can be used. In the electric vehicle 10 according to the embodiment in which the fuel cell 30 and the capacitor 32 are provided in parallel to the drive motor 36, the output from the fuel cell can be suppressed and the range where the drive motor can be used can be increased when a request is made such that the output which reaches the peak thereof is produced and the peak control is performed. Accordingly, the electric vehicle 10 in which the fuel cell 30 and the capacitor 32 are provided in parallel to the drive motor 36 is advantageous compared with the electric vehicle in which the fuel cell and the secondary battery are provided in parallel to the drive motor.

In the electric vehicle 10 according to the embodiment, the fuel cell 30 and the capacitor 32 both of whose performance is in the necessary/sufficient range are used. However, the fuel cell 30 and the capacitor 32 both of whose performance is in the hatched preferred range shown in FIG. 2 may be selected and used in the electric vehicle 10. Also, the fuel cell 30 and the capacitor 32 both of whose performace is in the condition satisfaction range where the upper right range with respect to the solid line "A" and the upper right range with respect to the dashed line "B" overlap each other in FIG. 2 may be selected and used in the electric vehicle 10.

In the electric vehicle 10 according to the embodiment, the drive motor 36 is used whose performance for making rated output substantially equal to the sum of the maximum output of the fuel cell 30 mounted on the electric vehicle 10 and the maximum output of the capacitor 32 at the operating voltage of the fuel cell 30 which is operated so as to produce the maximum output. However, the motor whose performance is equal to or higher than the above-mentioned performance may be used as the drive motor 36.

While the invention has been described in detail with reference to the preferred embodiments, it will be apparent to those skilled in the art that the invention is not limited to the above-mentioend embodiments, and that the invention may be realized in various other embodiments within the scope of the invention.

What is claimed is:

1. An electric vehicle, comprising:
an electric motor which outputs power to an axle shaft;
a drive circuit of the electric motor;
a fuel cell which is electrically connected to the electric motor such an electric power of the fuel cell is supplied to the electric motor via the drive circuit; and
a capacitor which is connected in parallel to the fuel cell, wherein
a maximum output of the fuel cell and a capacitance of the capacitor are set such that a first running condition for obtaining a predetermined high vehicle speed by repeatedly starting the vehicle at maximum acceleration required of the vehicle and a second running condition for repeatedly changing a vehicle speed from a first medium vehicle speed to a second medium vehicle speed at the maximum acceleration required of the vehicle are satisfied.

2. The electric vehicle according to claim 1, wherein
the capacitance of the capacitor is set so as to be with in a predetermined range over a minimum capacitance which satisfies the first running condition and the second running condition when the fuel cell is operated in a range up to the maximum output that is set in the fuel cell.

3. The electric vehicle according to claim 1, wherein
the maximum output of the fuel cell is set so as to be within a predetermined range over a minimum output that satisfies the first running condition and the second running condition when the capacitor is operated in a range of the capacitance which is set in the capacitor.

4. The electric vehicle according to claim 1, wherein
the maximum output of the fuel cell and the capacitance of the capacitor are set so as to be in a predetermined range including a point at which a minimum relationship between the maximum output of the fuel cell and the capacitance of the capacitor that is required for satisfying the first running condition and a minimum relationship between the maximum output of the fuel cell and the capacitance of the capacitor that is required for satisfying the second running condition overlap each other.

5. The electric vehicle according to claim 1, wherein
the maximum output of the fuel cell and the capacitance of the capacitor are set such that a cost of the fuel cell and the capacitor is substantially minimum.

6. The electric vehicle according to claim 1, wherein
when a vehicle weight is approximately 2t, the fuel cell and the capacitor are used at a voltage of 240 to 500V, the maximum output of the fuel cell is set to a value near 95 kW, and the capacitance of the capacitor is set to a value near 7F.

7. The electric vehicle according to claim 6, wherein
a maximum output of the electric motor is set to a value near 85 kW.

8. The electric vehicle according to claim 1, wherein
the maximum output of the electric motor is set to a value substantially equal to a sum of the maximum output of the fuel cell and a maximum output of the capacitor at an operating voltage of the fuel cell which is operated so as to produce the maximum output.

9. The electric vehicle according to claim 1, wherein
the drive circuit is a inverter.

10. The electric vehicle according to claim 9, wherein
the inverter converts an electric power which is obtained by performing regenerative-control of the drive motor to direct current power, and
the capacitor stores the direct current power.

11. The electric vehicle according to claim 1, wherein
the capacitor is an electric double layer capacitor.

12. A performance setting method for setting performance of a fuel cell and performance of a capacitor, which are to be mounted on an electric vehicle that runs by supplying electric power from the fuel cell and the capacitor to a drive circuit of an electric motor which can output power to an axle shaft without converting a voltage of the electric power, comprising:
setting a maximum output of the fuel cell and a capacitance of the capacitor such that a first running condition for obtaining a predetermined high vehicle speed by repeatedly starting the vehicle at maximum acceleration required of the vehicle and a second running condition for repeatedly changing a vehicle speed from a first medium vehicle speed to a second medium vehicle speed at the maximum acceleration required of the vehicle are satisfied.

13. The performance setting method according to claim 9, wherein
the capacitance of the capacitor is set so as to be within a predetermined range over a minimum capacitance which satisfies the first running condition and the second running condition when the fuel cell is operated in a range up to the maximum output that is set in the fuel cell.

14. The performance setting method according to claim 9, wherein
the maximum output of the fuel cell is set so as to be within a predetermined range over a minimum output which satisfies the first running condition and the second running condition when the capacitor is operated in a range of the capacitance that is set in the capacitor.

15. The performance setting method according to claim 9, wherein
the maximum output of the fuel cell and the capacitance of the capacitor are set so as to be in a predetermined range including a point at which a minimum relationship between the maximum output of the fuel cell and the capacitance of the capacitor that is required for satisfying the first running condition and a minimum relationship between the maximum output of the fuel cell and the capacitance of the capacitor that is required for satisfying the second running condition overlap each other.

16. The performance setting method according to claim 9, wherein the maximum output of the fuel cell and the capacitance of the capacitor are set such that a cost of the fuel cell and the capacitor is substantially minimum.

* * * * *